(12) United States Patent
Vehra

(10) Patent No.: US 11,401,783 B2
(45) Date of Patent: Aug. 2, 2022

(54) FAULT TOLERANT DOWNHOLE POWER REGULATOR

(71) Applicant: Halliburton Energy Services, Inc., Houston, TX (US)

(72) Inventor: Imran Sharif Vehra, Kingwood, TX (US)

(73) Assignee: Halliburton Energy Services. Inc., Houston, TX (US)

( * ) Notice: Subject to any disclaimer, the term of this patent is extended or adjusted under 35 U.S.C. 154(b) by 341 days.

(21) Appl. No.: 16/574,541

(22) Filed: Sep. 18, 2019

(65) Prior Publication Data
US 2020/0386079 A1 Dec. 10, 2020

Related U.S. Application Data

(60) Provisional application No. 62/859,548, filed on Jun. 10, 2019.

(51) Int. Cl.
| | |
|---|---|
| *H02M 3/335* | (2006.01) |
| *E21B 41/00* | (2006.01) |
| *E21B 33/10* | (2006.01) |
| *G01V 11/00* | (2006.01) |
| *E21B 34/06* | (2006.01) |
| *E21B 4/04* | (2006.01) |
| *H02M 7/48* | (2007.01) |
| *E21B 47/13* | (2012.01) |

(52) U.S. Cl.
CPC ............ *E21B 41/0085* (2013.01); *E21B 4/04* (2013.01); *E21B 33/10* (2013.01); *E21B 34/06* (2013.01); *E21B 47/13* (2020.05); *G01V 11/002* (2013.01); *H02M 3/335* (2013.01); *H02M 7/48* (2013.01)

(58) Field of Classification Search
CPC .......... H02M 7/02; H02M 7/04; H02M 7/155; H02M 7/162; H02M 7/219; H02M 7/48; H02M 3/335; E21B 41/0085; E21B 47/13; E21B 33/10; E21B 34/06
See application file for complete search history.

(56) References Cited

U.S. PATENT DOCUMENTS

| | | | |
|---|---|---|---|
| 7,053,594 B2 | 5/2006 | Sutardja et al. | |
| 9,846,469 B2 | 12/2017 | Tomas et al. | |
| (Continued) | | | |

FOREIGN PATENT DOCUMENTS

KR  1020150132530 A  11/2015

OTHER PUBLICATIONS

Foreign communication from a related International Application No. PCT/US2019/052715, International Search Report and Written Opinion, dated Mar. 31, 2020, 14 pages.

(Continued)

*Primary Examiner* — Nguyen Tran
(74) *Attorney, Agent, or Firm* — Conley Rose, P.C.; Rodney B. Carroll

(57) ABSTRACT

A high-speed current sensing circuit configured to measure current associated with switching devices of a power generation system. The circuit includes logic for turning one or more corresponding switching devices off before failure, so as to limit the duty cycle of the one or more corresponding switching devices. In the event of a failure, the system is configured to continue operating and generating energy to complete or at least continue performing the service despite the failure.

20 Claims, 12 Drawing Sheets

(56) References Cited

U.S. PATENT DOCUMENTS

| | | |
|---|---|---|
| 2004/0178776 A1 | 9/2004 | Hansen et al. |
| 2006/0006847 A1* | 1/2006 | Chen .................. H02M 7/1623 322/89 |
| 2013/0308346 A1 | 11/2013 | Divan et al. |
| 2018/0034358 A1* | 2/2018 | Geske .................. H03K 17/165 |

OTHER PUBLICATIONS

Filing Receipt and Specification for patent application entitled, "Fault Tolerant Downhole Power Regulator," filed Jun. 10, 2019 as U.S. Appl. No. 62/859,548.

* cited by examiner

FAULT TOLERANT DOWNHOLE POWER REGULATOR

CROSS-REFERENCE TO RELATED APPLICATIONS

This application claims priority to U.S. Provisional Application No. 62/859,548, filed on Jun. 10, 2019, the disclosure of which is hereby incorporated by reference in its entirety.

BACKGROUND

The present disclosure relates to current sensing circuits for controlling electronic devices in a power supply system for downhole tools.

Hydrocarbons, such as oil and gas, are commonly obtained from subterranean formations that may be located onshore or offshore. Subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation. Some or all of these steps may employ downhole components or devices comprising electronic elements that require electrical power to operate. For example, direct current (DC) power can be provided by converting alternating current (AC) power from a downhole alternator using rectification circuitry and a capacitor bank to smooth out voltage fluctuations in the rectified signal.

Many abnormal situations can present themselves due to harsh downhole conditions, including overvoltage events on alternator terminals, alternator faults, turbine-alternator coupling failures, over-temperature situations, and failures in the capacitor bank or load. These abnormal situations may cause damage to the electronic elements of a downhole component and/or may result in a loss of power to one or more downhole components. Damage or loss of power to a downhole component may disrupt a wellbore service being performed (e.g., drilling) and require costly down time associated with halting the wellbore service to retrieve and repair the downhole components (e.g., tripping drill pipe out of and back into the wellbore).

BRIEF DESCRIPTION OF DRAWINGS

These drawings illustrate certain aspects of certain embodiments of the present disclosure. These drawings should not be used to limit or define the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

Disclosed herein is a high-speed current sensing circuit to limit or prevent damage to electronic downhole components, provide for continued operation of the electronic downhole components in a reduced power mode, or both. To this end, the high-speed current sensing circuit is configured to measure current flowing through switching devices and instantly turn off switching devices when current measurement is indicative of a fault event (e.g., short circuit). During the fault event or condition, a power supply may generate enough power to allow the electronic downhole components to continue operating in a reduced power mode such that a wellbore servicing operation such as drilling may be continued.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, and drilling operations including MWD and/or LWD.

Figure 1:
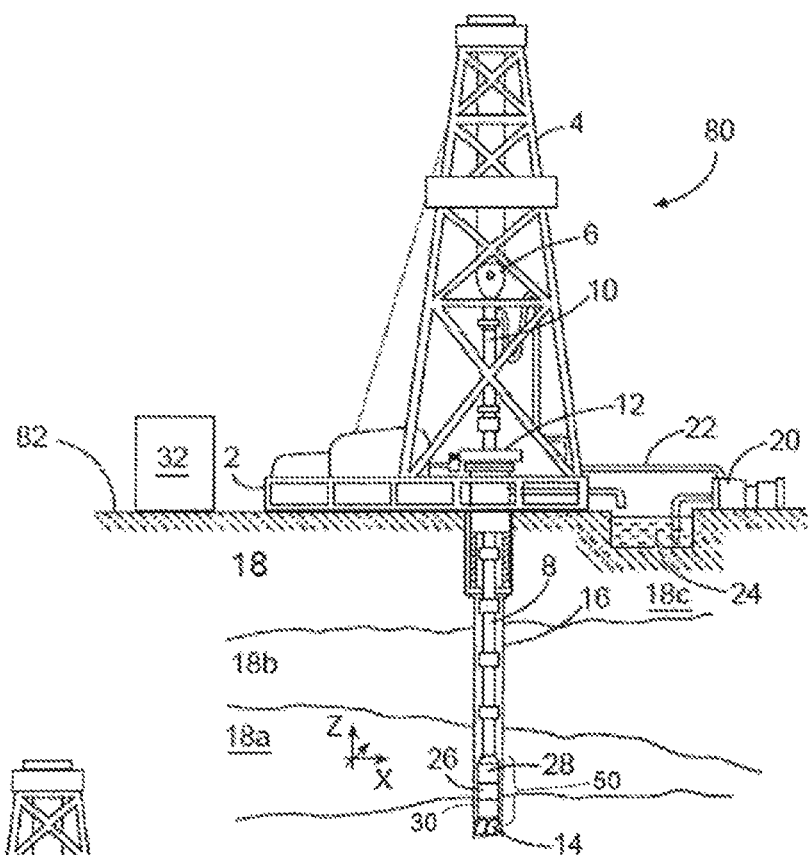
FIG. 1 illustrates an example subterranean drilling system in accordance with embodiments of the present disclosure.

FIG. 1 illustrates an example subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18*a-c*, and the drilling platform 2 may be in contact with the surface 82. In other embodiments, such as in an off-shore drilling operation, the surface 82 may be separated from the drilling platform 2 by a volume of water. The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus between drill string 8 and borehole 16, and into a retention pit 24. The drilling fluid lubricates the drill string 8, transports cuttings from the borehole 16 into the pit 24 and aids in maintaining integrity or the borehole 16.

The drilling system 80 may comprise a bottom hole assembly (BHA) 50 coupled to the drill string 8 near the drill bit 14. The BHA 50 may comprise different combinations of drill collars; subs such as stabilizers, reamers, shocks, hole-openers; and various downhole tools, including, but not limited to, LWD/MWD systems, telemetry systems, downhole motors to drive the drill bit 14, and rotary steerable assemblies for changing the drilling direction of the drill bit 14. As depicted, the BHA 50 comprises LWD/MWD elements 26, telemetry element 28, and downhole power generator 30. As the bit 14 extends the borehole 16 through the formations 18, the LWD/MWD elements 26 may collect measurements relating to borehole 16. The LWD/MWD elements 26 may be communicably coupled to the telemetry element 28. The telemetry element 28 may transfer measurements from LWD/MWD elements 26 to a surface receiver and/or to receive commands from the surface receiver via a system controller 32. The telemetry element 28 may comprise a mud pulse telemetry system, an acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the system controller 32.

Figure 3:
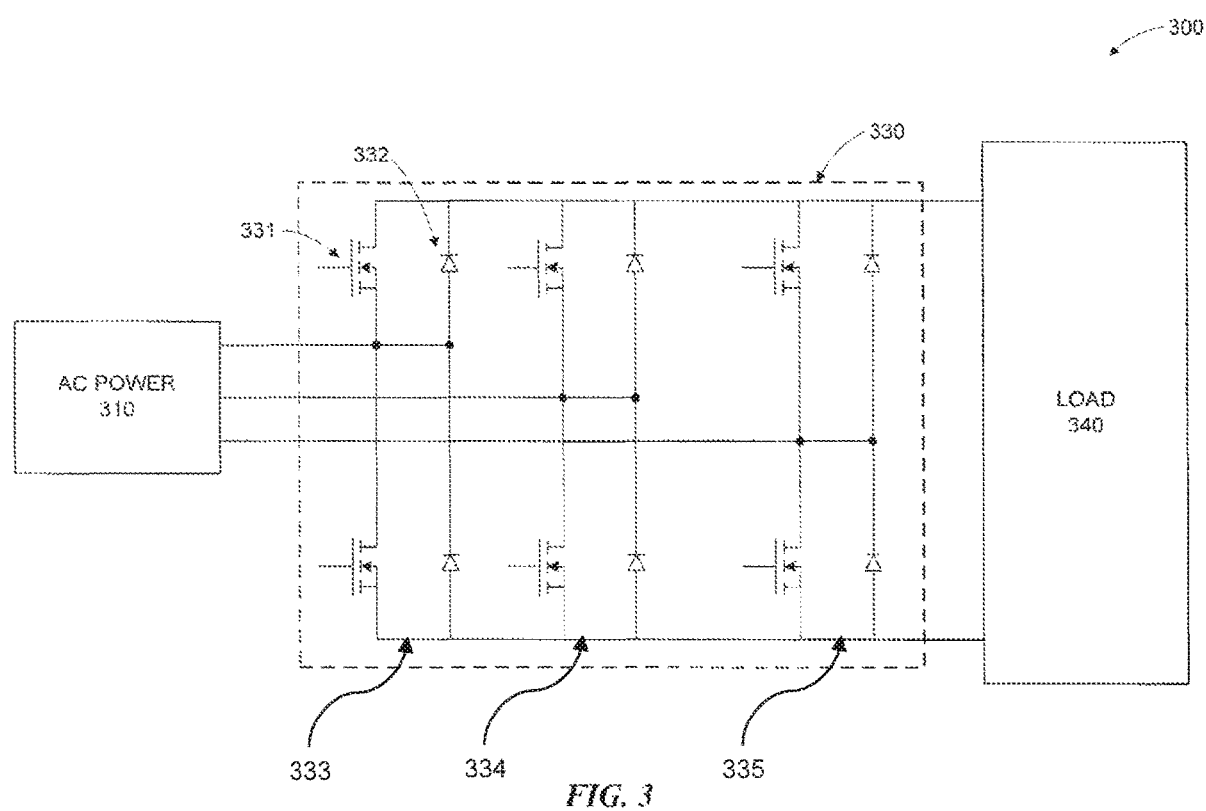
FIG. 3 illustrates an example downhole electronic circuit comprising an AC power source, an AC-DC converter circuit, and a load in accordance with embodiments of the present disclosure.

The downhole power generator 30 may be coupled and provide power to electronic components within the BHA 50, including electronic components within the LWD/MWD elements 26 and telemetry system 28. Example electronic components include, but are not limited to, sensors, control units, motors, and solenoids. The downhole power generator 30 may comprise one or more alternators and associated circuitry to generate AC output signals that are then converted to provide DC power, as shown in FIG. 3, to the BHA 50 and electrical components thereof. The generator 30 may generate power based on the operation of drill string 8, or based on the flow of drilling fluid through components of drilling system 80. The amount of power provided by the generator 30 may depend, in part, on the power requirements of the electronic components in the BHA 50, the number of alternators within the generator 30, and the power ratings of the electronic components within the generator 30. The number and arrangement of alternators may depend, in part, on the configuration of the generator 30 and the voltage requirements of the BHA 50. In some embodiments, as will be described in detail below, one or more current sensing circuits may be included in the generator 30 to control and protect electronic components from damage caused by harsh downhole conditions.

Figure 2:
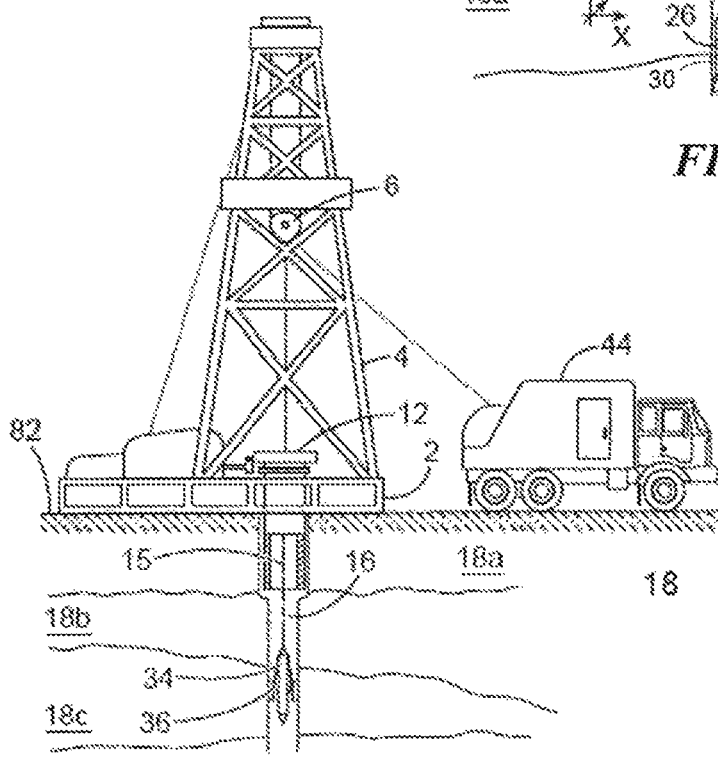
FIG. 2 illustrates an example subterranean drilling system with the drill string removed in accordance with embodiments of the present disclosure.

At various times during or after the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool from a surface power source (e.g., a thermoelectric power generator), and telemetry from the tool body to the surface 82. The power transported from the surface may comprise AC power, for instance, that is converted to DC power downhole, or it may comprise DC power that is transmitted from the surface. The wireline tool 34 may comprise electronic components similar to the electronic components described above. For instance, the wireline tool 34 may comprise logging and measurement elements 36, similar to the LWD/MWD elements of BHA 50 described above, which may comprise one or more electronic components in the form of sensors and controllers. The logging and measurement elements 36 may perform functions such as measuring current, voltage, pressure, and/or temperature of electronic components associated with downhole tools (e.g., wireline tool 34).

The logging and measurement elements 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the elements 36. The computing facilities may be communicatively coupled to the elements 36 by way of the cable 15. In certain embodiments, the system controller 32 may serve as the computing facilities of the logging facility 44.

Modifications, additions, or omissions may be made to FIGS. 1-2 without departing from the scope of the present disclosure. For instance, FIGS. 1-2 illustrate components of subterranean drilling system 80 in a particular configuration. As an example, the position of the generator 30 within the BHA 50 of the system 80 may differ from the embodiment depicted. It will be understood that any suitable configuration of components for drilling or logging a wellbore may be used. Furthermore, fewer components or additional components beyond those illustrated may be included in subterranean drilling system 80 without departing from the scope of the present disclosure.

Power converters may be used in the example power generators described above, as well as power generators used in other capacities, and in downhole applications can be single-phase, three-phase, or multi-phase, and may include rectifiers, inverters, or the like. In certain embodiments, this may include a three-phase active rectifier or a diode bridge rectifier fed by an alternating current (AC) generator, which in turn supplies an electronic load comprising one or more electronic elements.

FIG. 3 illustrates an example downhole electronic circuit 300 comprising an AC power source 310, an AC-DC converter circuit 330, and a load 340 in accordance with embodiments of the present disclosure. The power from AC power source 310 may be generated by a power source located on a drill string (e.g., power generator 30) in LWD/MWD embodiments of FIG. 1, for example, or from a surface power source (e.g., a thermoelectric power generator) in wireline embodiments of FIG. 2. The power from AC power source 310 may be three-phase AC power as shown in FIG. 3.

The AC-DC converter circuit 330 may convert the AC power received from the AC power source 310 into a DC voltage output. AC-DC converter circuit 330 may comprise an active rectifier circuit that may include active electrical components (e.g. transistors) and passive electrical components (e.g., diodes). For example, the AC-DC converter circuit 330 includes three sub-circuits 333, 334, and 335 connected to a corresponding phase of the AC-power source 310. As shown in FIG. 3, each sub-circuit 333, 334, and 335 includes a pair of upper and lower switching devices 331 and diodes 332 connected in parallel with one another. Further, one or more semiconductor drivers connected to the switching devices 331 may turn the switching devices 331 on and off via control signals received from a control unit (e.g., system controller 32), which may control operation of the switching devices 331 according to an algorithm, a switching pattern, duty cycle (e.g., the proportion of "on" time to one cycle), etc.

Switching devices 331 may include any suitable switching device such as thyristors, junction gate field-effect transistors (JFETs), metal-oxide-semiconductor field-effect transistors (MOSFETs), insulated-gate bipolar transistors (IGBTs), bi-polar junction transistors (BJTs), and/or silicon-controlled rectifiers (SCRs). In certain embodiments, diodes 332 may be built into or be a component of the switching device 331 (e.g., a body diode) with which it is connected in parallel. The DC output voltage from the AC-DC converter circuit 330 may then be provided to a load 340, which may include one or more electrical components of a subterranean drilling and/or logging system (e.g., subterranean drilling system 80 of FIGS. 1-2). In certain embodiments, a capacitor bank (e.g., capacitor bank 450) may be disposed between the AC-DC converter circuit 330 and load 340, to protect against variations in the DC output voltage provided to load 340.

Modifications, additions, or omissions may be made to FIG. 3 without departing from the scope of the present disclosure. For example, while FIG. 3 illustrates a three-phase downhole electronic circuit 300, it will be understood that downhole electronic circuit 300 may be single-phase, down-phase, or multi-phase. As another example, AC-DC converter circuit 330 may comprise a diode bridge rectifier circuit or Vienna rectifier circuit rather than an active rectifier circuit as illustrated. Furthermore, fewer components or additional components beyond those illustrated may be included in downhole electronic circuit 300 without departing from the scope of the present disclosure.

Due to harsh downhole conditions, various fault events at the power source 310 can arise during use. These fault events include, but are not limited to, overvoltage events on alternator terminals, alternator faults, turbine-alternator coupling failures, wiring damage, over-temperature situations, shorts between phases, shorts from phase to chassis, shorts from phase to ground, etc. Fault events can also occur in the converter circuit 330 and/or load 340. One or more components of downhole electronic circuit 300 may be susceptible to damage or destruction caused by the fault events. For example, alternator overvoltage events may cause damage to one or more of switching devices 331, diodes 332, or components of load 340. Some more specific examples are discussed below with respect to FIGS. 4B and 4C.

FIGS. 4A-4G illustrate examples of a downhole electronic circuit 400 according to embodiments of the disclosure. The examples depicted in FIGS. 4A-4G are based on an implementation in which an AC-DC converter circuit 430 converts power received from an AC power source 410 (e.g., similar to AC power source 310) such as a 3-phase alternator, where coils A, B, and C represent windings of the 3-phase alternator. In other implementations, the AC power source 410 may comprise other suitable types of power sources. Further, while the power source 410 is not depicted in FIGS. 4A, 4C, 4D, 4E, and 4F, it is to be understood that coils A, B, and C in FIGS. 4A, 4C, 4D, 4E, and 4F represent the windings of the power source 410 depicted in FIGS. 4A and 4G.

Except as stated below, it may be assumed that the downhole electronic circuit 400 is substantially similar to the downhole electronic circuit 300. For example, the AC-DC converter 430 comprises switching devices such as FETs Q1-Q6 and diodes D1-D6 connected in parallel with one another similar to switching devices 331 and diodes 332 of FIG. 3. Alternatively, diodes D1-D6 can be a component of the FETs Q1-Q6, for example a body diode. In addition, a capacitor bank 450 may be disposed between the AC-DC converter circuit 430 and an electrical component (e.g., load 340) to protect against variations in DC voltage output by the AC-DC converter 430 via a DC link.

Figure 4A:
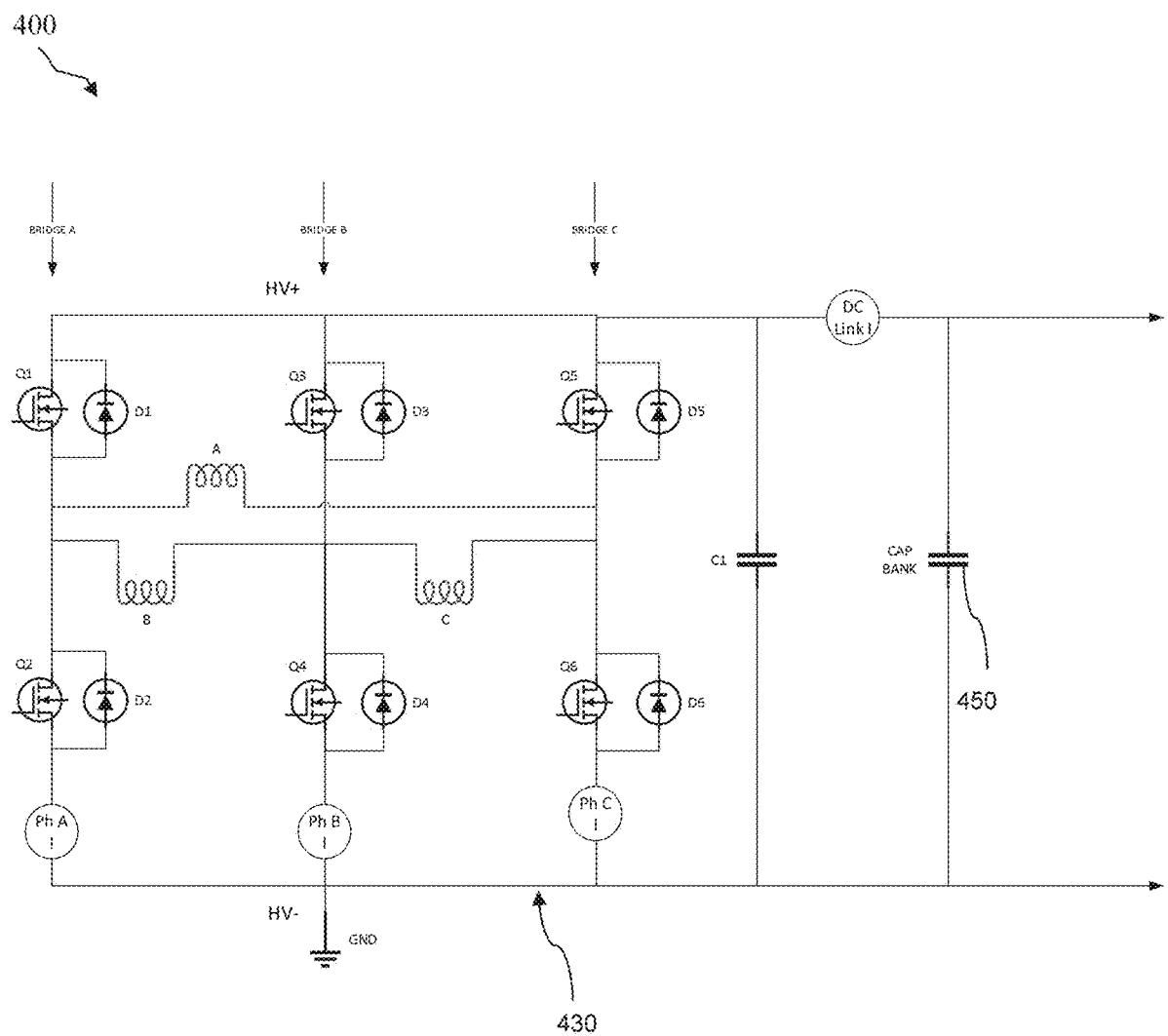
FIGS. 4A-4G illustrate another example downhole electronic circuit in accordance with embodiments of the present disclosure.
Figure 4B:
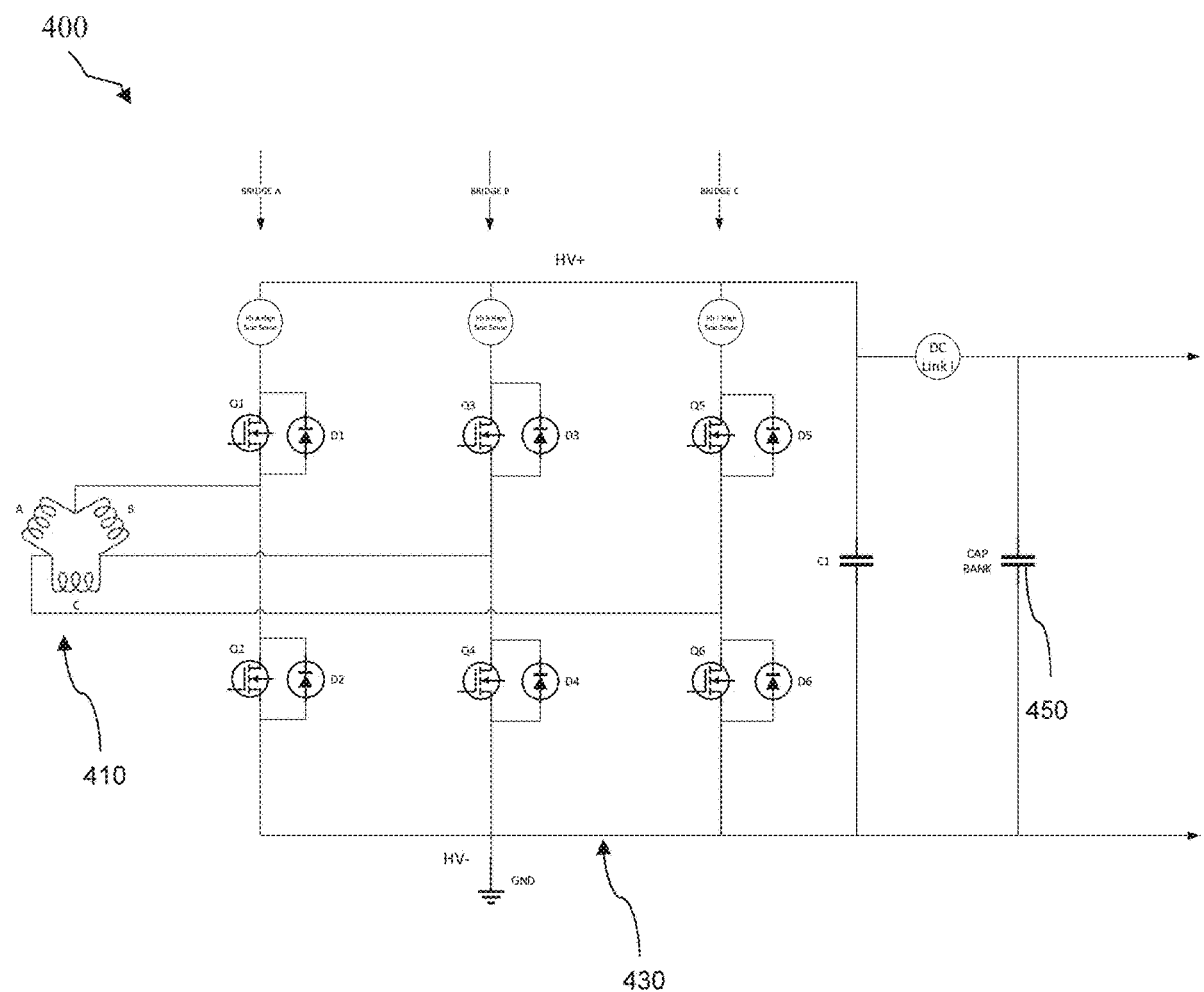
Figure 4C:
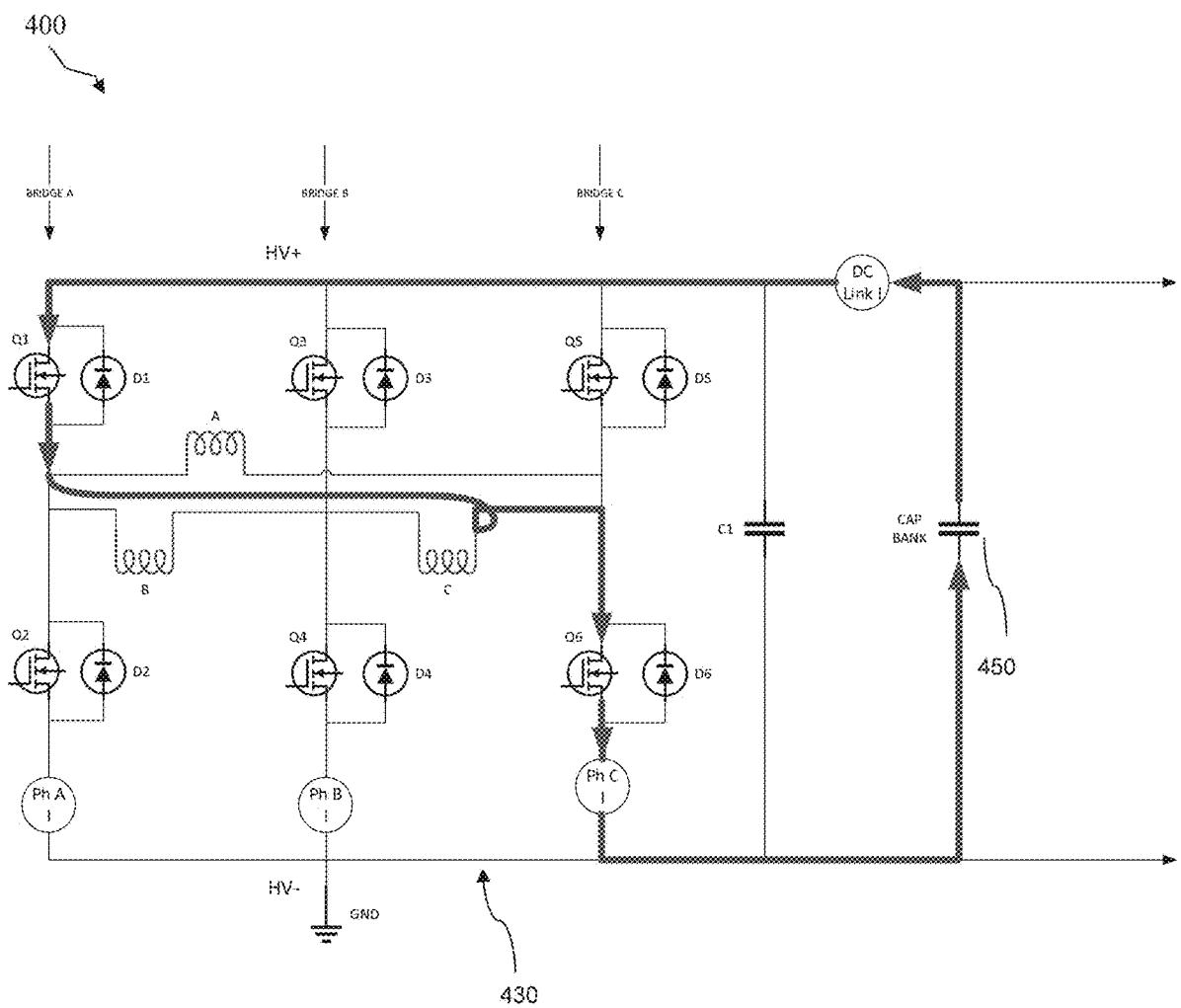
Figure 4D:
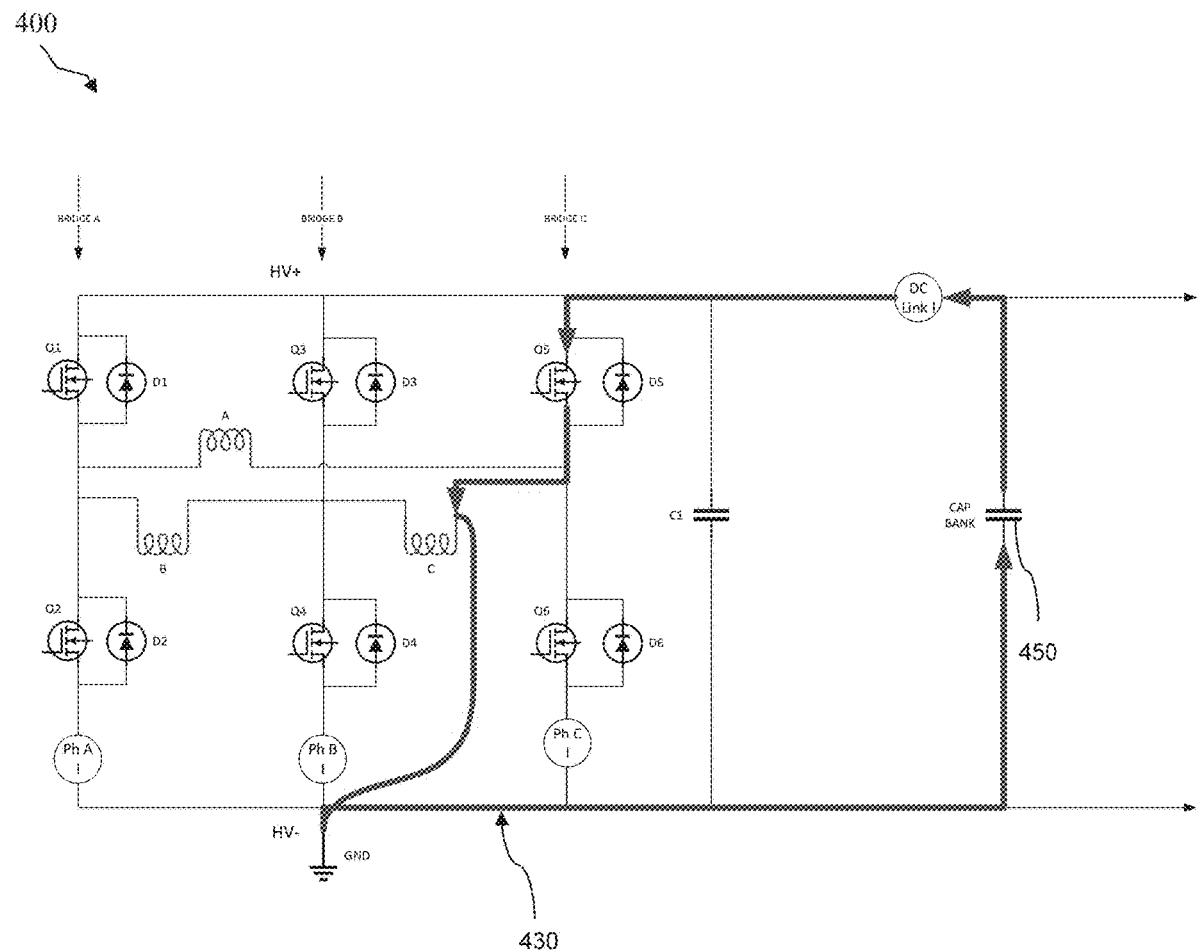

However, unlike the downhole electronic circuit 300, the downhole electronic circuit 400 in FIGS. 4A and 4C-4F comprises current sensing components Ph A, Ph B, and Ph C disposed on a low-power side of the AC-DC converter circuit 430 (or "low-side current sensing components Ph A, Ph B, and Ph C"), while the downhole electronic circuit 400 in FIG. 4B comprises current sensing components Ph A High Side Sense, Ph B High Side Sense, and Ph C High Side Sense disposed on a high-power side of the AC-DC converter circuit 430 (or "high-side current sensing components Ph A, Ph B, and Ph C"). The downhole electronic circuit 400 in FIG. 4G is similar to that shown in FIG. 4B, except the downhole electronic circuit 400 in FIG. 4G comprises a single high-side current sensing component (High Side Sense). Unless stated otherwise, the concepts described herein with respect to FIGS. 4A and 4C-4F are similarly applicable to those described with respect to FIGS. 4B and 4G, and vice-versa.

The low- and/or high-side current sensing components Ph A-Ph C may include any suitable components configured to measure current, such as Hall Effect sensors, magnetometers, inductive sensors, magnetic sensors, high- or low-side current sense resistors, etc. In some implementations, at least one low- and/or high-side current sensing component may comprise a resistor R1 coupled to a differential amplifier, such as shown in FIG. 4F. In such implementations, the value of the resistor R1 may be fixed. As such, current may be sensed by measuring voltage across the resistor R1 based on Ohm's law, i.e., I=V/R, where I represents current, V represents voltage, and R represents resistance.

Current measurements obtained by the low- and/or high-side current sensing components Ph A-Ph C may be output to a local or remote control unit such as the system controller 32, which may use these measurements to determine or estimate current flowing through each phase of the 3-phase alternator or each bridge corresponding to the current sensing components Ph A-Ph C and associated sub-circuits. As shown in FIGS. 4A-4G, Bridge A corresponds to current sensing component Ph A and a sub-circuit (e.g., sub-circuit 333) including Q1-D1 and Q2-D2; Bridge B corresponds to current sensing component Ph B and a sub-circuit (e.g., sub-circuit 334) including Q3-D3 and Q4-D4; and Bridge C corresponds to current sensing component Ph C and a sub-circuit (e.g., sub-circuit 335) including Q5-D5 and Q6-D6.

In some implementations, the downhole electronic circuit 400 may comprise a local device configured to store an electric charge, such as a ceramic capacitor C1. Although only one capacitor C1 is shown in FIGS. 4A-4G, the downhole electronic circuit 400 may comprise a plurality of distributed capacitors like the capacitor C1. Further, such distributed capacitors may be disposed relatively close to the FETs Q1-Q6 in order to quickly absorb noises and overshoot voltages created when switching the FETs Q1-Q6 on and off.

As previously discussed, various fault events may occur during operation of the 3-phase alternator due to harsh downhole conditions. For example, FIG. 4C depicts an example in which a fault occurs in one or more alternator windings such as a phase-to-phase short or a short from winding to winding, i.e., a short between phases or windings. The thicker lines in FIG. 4C represent the path of the short current. As a result of the short, energy or current stored in the capacitor bank 450 shunts through one or more of FETs Q1-Q6, causing one or more of FETs Q1-Q6 to fail. FIG. 4D depicts another example in which a fault occurs in one or more alternator windings, except this fault is a short between phase and chassis, which is ground (GND) in this example. As shown via the thicker lines in FIG. 4D, the path of the short current flows through only one of the FETs (i.e., FET Q5).

In some cases, the downhole electronic circuit 400 may be configured to monitor and/or control one or more operating parameters (e.g., current, voltage, etc.) of the AC-DC converter circuit 430. In addition, the downhole electronic circuit 400 may control operation of the AC-DC converter circuit 430 based on measurements from one or more downhole sensors (e.g., measurements indicative of a fault or potential fault condition) of a system (e.g., drilling system 80) associated with the downhole electronic circuit 400. The one or more downhole sensors may measure current output at the 3-phase alternator, voltage output at the 3-phase alternator, rotational speed of the 3-phase alternator, ambient temperature, temperature of a component of downhole power source, or any combination thereof.

Measurements from such one or more downhole sensors may be used to prevent operation of the AC-DC converter 430 and/or the 3-phase alternator (e.g., AC power source 310 or 410) in the event of a fault, thereby preventing damage to the electronic downhole circuit 400 and reducing repair costs for components thereof. Nevertheless, some losses may still be incurred when faults occur. For instance, while preventing operation may protect the downhole electronic circuit 400 and/or related components from damage, doing so halts power generation. As previously mentioned, loss of power to such downhole components may disrupt a wellbore service being performed (e.g., drilling) and require costly down time associated with disrupting the wellbore service to retrieve the downhole components (e.g., tripping drill pipe out of and back into the wellbore). These problems can be exacerbated should power to downhole components be needlessly terminated (e.g., when a power regulation system trips due to a false alarm or when a fault condition is intermittent or temporary).

In some embodiments, the low- and/or high-side current sensing components Ph A-Ph C may detect current surging through each FET Q1-Q6 or Bridge A-C when faults occur so that one or more FETs may be opened to prevent failure. For example, the low- and/or high-side current sensing components Ph A-Ph C may be configured to detect a threshold current, which may be set to a value below the maximum current at which the FETs Q1-Q6 are rated. Thus, when current rises due to a phase-to-phase short such as shown in FIG. 4C, a low-side current sensing component Ph A, Ph B, or Ph C may detect that current has reached the threshold current. In turn, each FET or Bridge A, B, or C corresponding to that low-side current sensing component Ph A, Ph B, or Ph C may be controlled to prevent one or more FETs from over current failure.

However, when current rises due to a short between phase and chassis, the low- and/or high-side current sensing components Ph A-Ph C may not be capable of detecting large current surges that cause FETs to fail. As shown in FIG. 4D, for example, the current path may be such that the low-side current sensing components Ph A-Ph C are not in position to detect the inrush current flowing from the capacitor bank 450 and distributed capacitors like capacitor C1. Further, there may be insufficient time to prevent FETs from failing due to the relatively fast slew rate (di/dt) of inrush current flowing from the capacitors. For instance, regardless of whether a phase-to-phase or a phase-to-ground short occurs, one or more of the FETs Q1-Q6 may fail unless their corresponding gates are opened quickly enough (e.g., before the maximum breakdown current is reached). Slew rate may depend upon the resistance and/or impedance of the short circuit. Consequently, there may be scenarios where the slew rate of inrush current may simply be too fast to react within time to protect electronic components such as the FETs Q1-Q6.

Figure 4E:
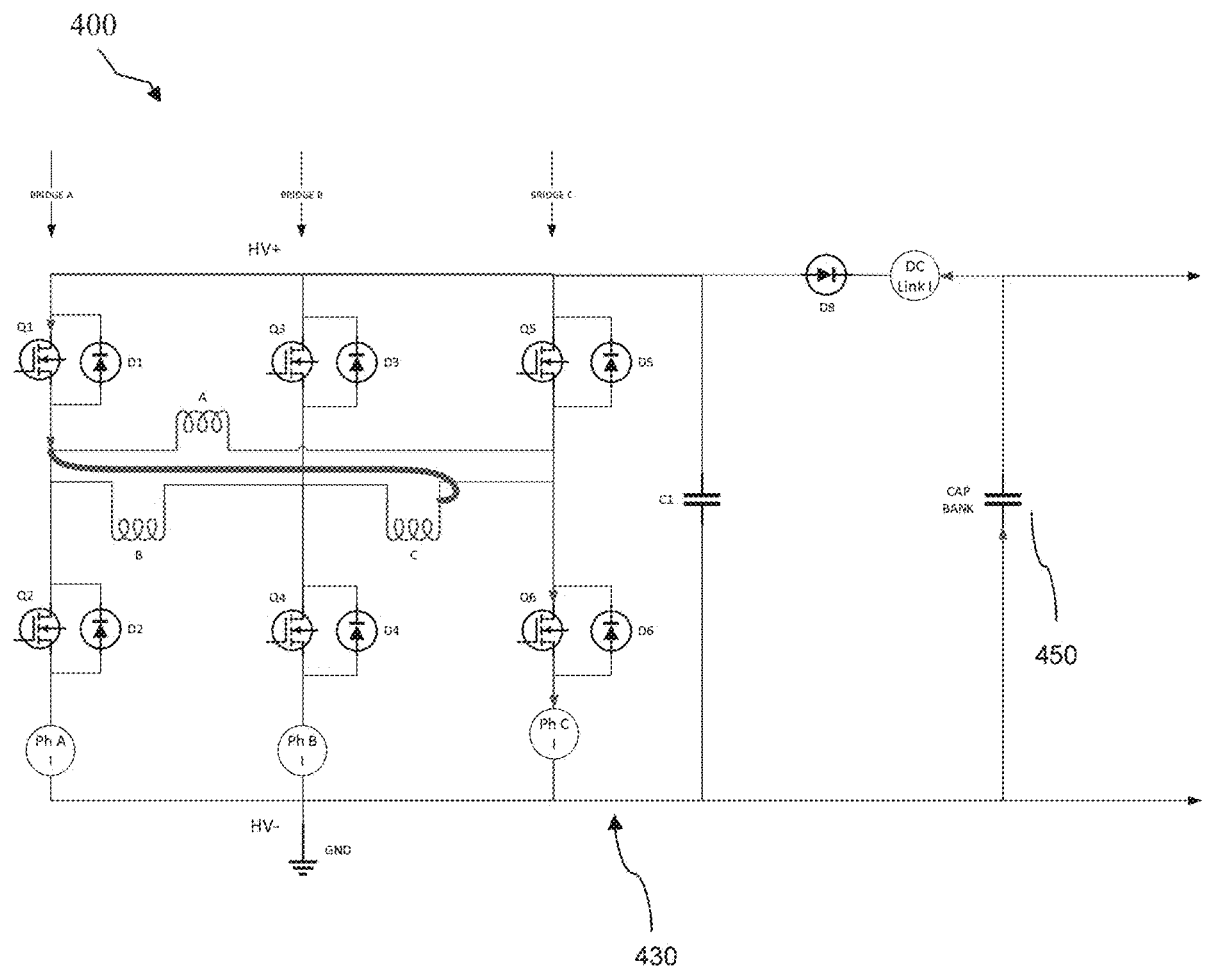
Figure 4F:
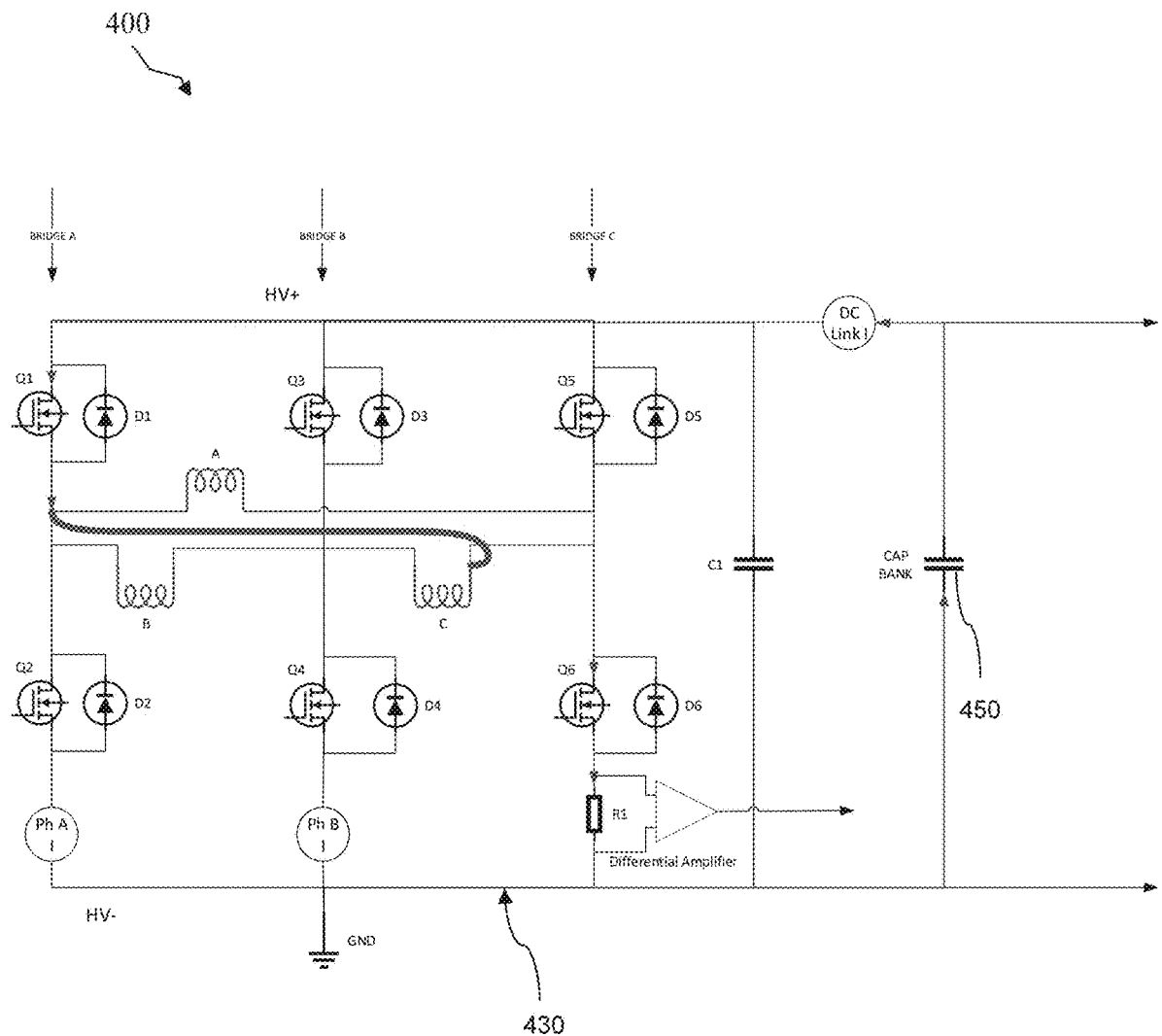
Figure 4G:
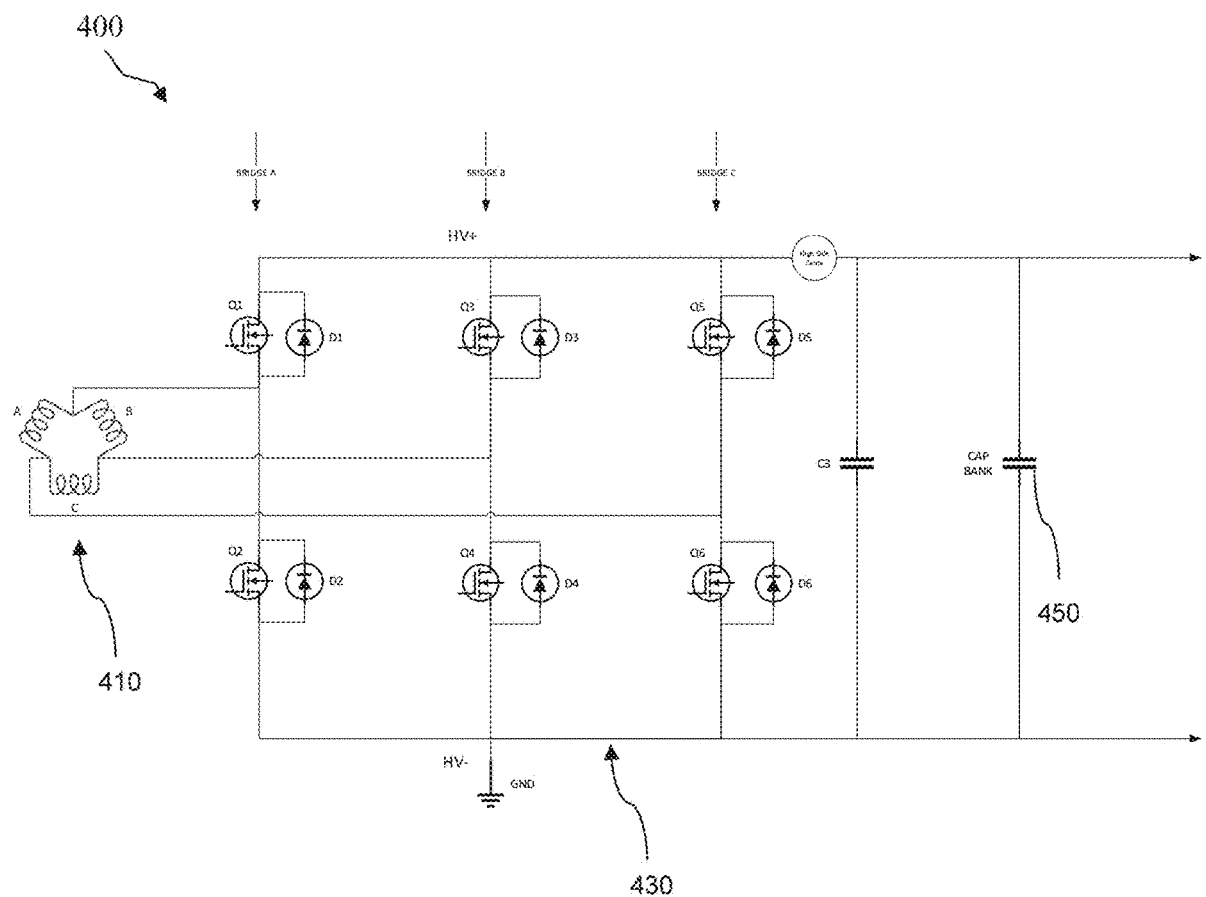

FIG. 4E illustrates an example in which the downhole electronic circuit 400 comprises at least one component configured to reduce the inrush current from the capacitor bank 450 and distributed capacitors like capacitor C1. In this example, the downhole electronic circuit 400 includes a blocking diode D8 disposed in the DC link bus. The blocking diode D8 is a unidirectional component designed to only permit flow through one direction. During normal operation, current flows through the downhole electronic circuit 400 from left to right, thereby charging the capacitors C1 and 450. Thus, with the blocking diode D8 disposed in the DC link bus as shown in FIG. 4E, the blocking diode D8 should not hinder or otherwise impact components of the downhole electronic circuit 400 during normal operation.

During a fault event such as when a short occurs, current flow through the downhole electronic circuit 400 reverses direction. In such cases, the blocking diode D8 can prevent current flowing from the capacitor bank 450 to the FETs Q1-Q6. However, the blocking diode D8 in this example is not configured to prevent current flowing from capacitors other than the capacitor bank 450. Therefore, current from local capacitors (e.g., capacitor C1) may still flow through the FETs Q1-Q6 when shorts occur. While current spikes from such local capacitors can be relatively high, the overall energy should be noticeably lower than the inrush current from the capacitor bank 450. Furthermore, the FETs Q1-Q6 may be sized to withstand the current spikes from local capacitors such as capacitor C1.

In implementations where the downhole electronic circuit 400 includes a blocking diode D8 such as shown in FIG. 4E, the downhole electronic circuit 400 may further include a dump circuit disposed on the DC link bus. For example, the dump circuit may be disposed in parallel to the capacitor bank 450 and/or in series to blocking diode D8. The dump circuit may comprise an active device such as an IGBT that shunts the DC link to a heat dissipating resistor or a simple high current Zener diode in series to the heat dissipating resistor. In operation, such a dump circuit may be configured to dissipate energy to a resistor if voltage on the DC link bus exceeds a predetermined limit. Thus, the dump circuit may be useful when the downhole electronic circuit 400 includes a blocking diode D8, as the windings of the 3-phase alternator are isolated for dumping energy due to the blocking diode.

Modifications, additions, or omissions may be made to FIGS. 4A-4G without departing from the scope of the present disclosure. For example, some implementations of the downhole electronic circuit 400 may include a coil or an inductor disposed on the left side of DC link bus in FIGS. 4A-4G. This way, the coil or inductor may reduce the rate of shunt current increase in the event of a short.

As another example, some implementations of the downhole electronic circuit 400 may include at least one resistor disposed in series to the capacitor C1, which is typically designed to have a relatively low internal resistance or equivalent series resistance (ESR). Adding at least one resistor in series to the capacitor C1 may artificially increase the resistance of the capacitor C1, and therefore, provide increased protection to the FETs Q1-Q6 in fault events. It should be noted, however, that introducing at least one series resistor to the downhole electronic circuit 400 may somewhat deteriorate the original intended functionality of the capacitor C1 (e.g., absorbing electrical overshoots).

As yet another example, while FIGS. 4A-4G illustrate a three-phase downhole electronic circuit 400, it will be understood that the downhole electronic circuit 400 may be single-phase, down-phase, or multi-phase. As another example, the AC-DC converter circuit 430 may comprise a diode bridge rectifier circuit or Vienna rectifier circuit. Furthermore, fewer or additional components beyond those illustrated may be included in the downhole electronic circuit 400 without departing from the scope of the present disclosure. For example, the three-phase downhole electronic circuit 400 may comprise only switching device (e.g., FET, Q1, Q2, Q3, Q4, Q5, or Q6). In some examples, the downhole electronic circuit 400 may comprise more or less than six switching devices as shown.

Figure 5:
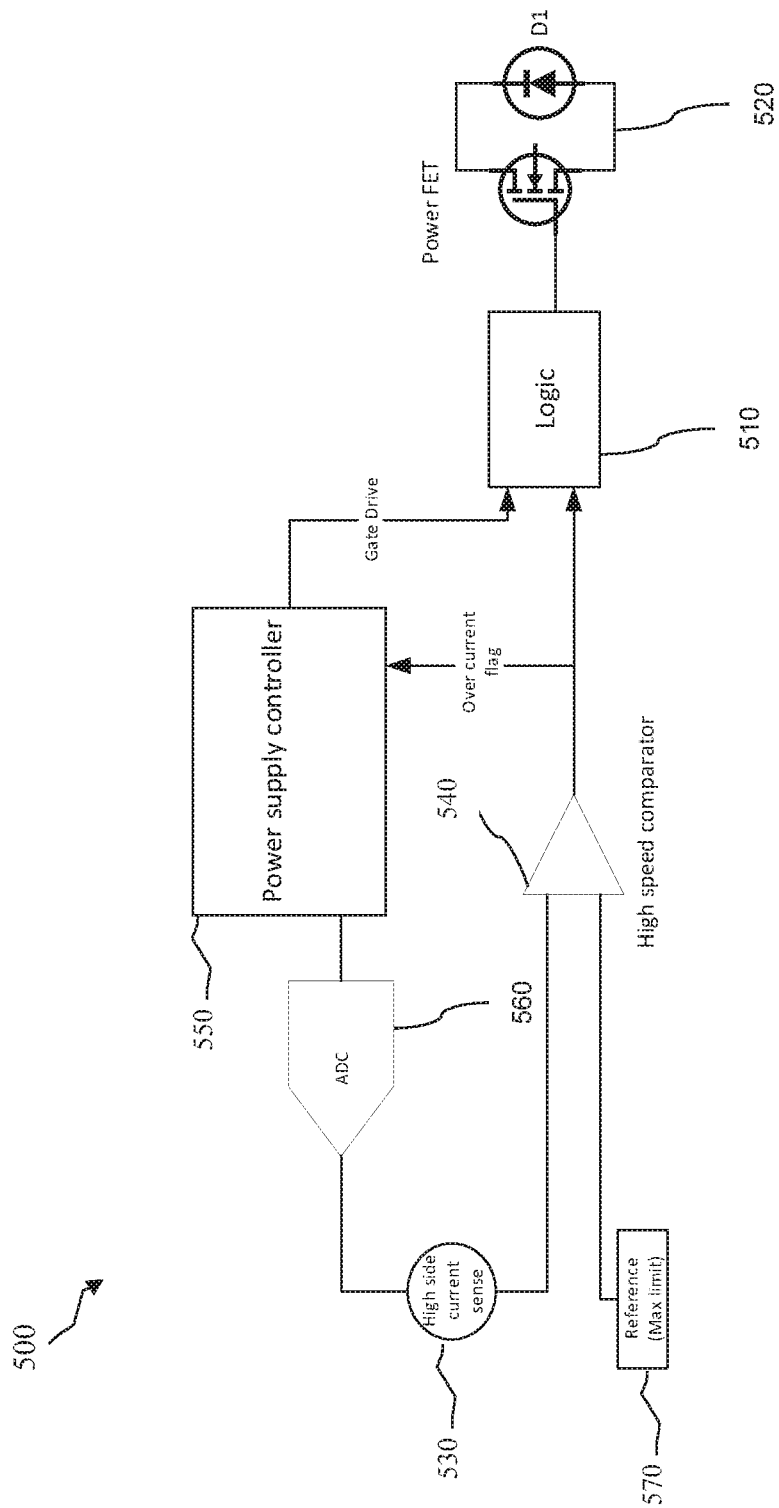
FIG. 5 illustrates a schematic diagram of a current sensing circuit in accordance with embodiments of the present disclosure.

FIG. 5 illustrates a schematic diagram of a current sensing circuit 500 according to embodiments of the present disclosure. The current sensing circuit 500 is configured to limit or prevent damage to downhole electronic components (e.g., circuits 300 and 400, load 340, etc.), provide for continued operation of the downhole electronic components in a reduced power mode, or both.

In some implementations, the current sensing circuit 500 may be disposed on a low-power side of an AC-DC converter circuit (e.g., circuit 330 or 430) such as shown in FIGS. 4A and 4C-4F. In other implementations, the current sensing circuit 500 may be disposed on a high-power side of an AC-DC converter circuit (e.g., circuit 330 or 430) such as shown in FIGS. 4B and 4G. In both types of implementations, the current sensing circuit 500 may replace the low- and/or high-side current sensing components Ph A-Ph C in FIGS. 4A-G. Alternatively, the current sensing circuit 500 may operate independently of the current sensing components Ph A-Ph C or in conjunction with the current sensing components Ph A-Ph C.

In one or more aspects, the current sensing circuit 500 may be configured to measure current flowing into and/or through each switching device in an AC-DC converter circuit (e.g., FETs Q1-Q6). In one or more aspects, the current sensing circuit 500 may be configured to measure current flowing into and/or through only one switching device in an AC-DC converter circuit (e.g., FET, Q1, Q2, Q3, Q4, Q5, or Q6). In one or more aspects, the current sensing circuit 500 may be configured to measure current flowing into and/or through only any one or more switching devices in an AC-DC converter circuit (e.g., FET, Q1, Q2, Q3, Q4, Q5, and/or Q6). In one or more aspects, the current sensing circuit 500 may be comprise a common circuit configured to measure current flowing through at least one location of an AC-DC converter circuit. For example, the current sensing circuit 500 may be disposed at or near the DC link bus in FIGS. 4A-4F. As another example, the current sensing circuit 500 may replace the blocking diode D8 in FIG. 4E, such as shown in FIG. 4G, where circuit 500 corresponds to the High Current Sense component shown in FIG. 4G.

In some examples, the current sensing circuit 500 may be disposed in series to each drain of the upper FETs (e.g., Q1, Q3, and Q5 in FIGS. 4A-4G). In other examples, the current sensing circuit 500 may be disposed in series to the windings of an alternator (e.g., coils A, B, C). For discussion purposes, the current sensing circuit 500 will be described as being disposed in series to the upper FETs on the high-power side of circuit 330 or circuit 430.

As shown in FIG. 5, the current sensing circuit 500 includes a logic block 510 coupled to a power FET 520, which may comprise any one or more of the switching devices 331 in FIG. 3 or FETs Q1-Q6 in FIGS. 4A-4G. The logic block 510 may take the form of a simple logic gate. Alternatively, the logic block 510 may include logic within a field-programmable gate array (FPGA) or a processor configured to operate at high speeds (e.g., within tenths of a nanosecond or microsecond).

The current sensing circuit 500 further includes a high-side current sense block 530 configured to measure current through each power FET 520. As discussed further below, the high-side current sense block 530 may perform such current measurements on a cycle-by-cycle basis. During operation, the high-side current sense block 530 is configured to output the current measurements to a high-speed comparator 540, which may be coupled to the logic block 510 and a power supply controller 550. In some implementations, the high-side current sense block 530 may also output current measurements to an analog-to-digital converter (ADC) 560 configured to sample the current measurements as part of a feedback loop control scheme implemented by the power supply controller 550. The power supply controller 550 may comprise a digital signal processing (DSP) unit, an FPGA, a digital controller, or the like. Alternatively, the power supply controller 550 may comprise an analog controller such as a pulse-width-modulation (PWM) control circuit on a chip. Further, the power supply controller 550 may be configured to switch the power FET 520 on and off in each cycle of an AC power source in a PWM mode. As discussed further below, the power supply controller 500 may be configured such that during every switching cycle, the power supply controller 500 controls a duty cycle of the power FET 520 and/or an AC power source according to the current measurements.

The comparator 540 may compare each current measurement to a threshold reference current, which indicates a maximum current tolerance of the power FET 520. The threshold reference current may be stored in any suitable location. For instance, the threshold reference current may be stored internally within the comparator 540, or it may be stored in a storage device 570 or a lookup table (LUT) accessible by the comparator 540. Further, regardless where the threshold reference current is stored, the threshold reference current may be adjustable or updated via software. For example, the power supply controller 500 may dynamically update the threshold reference current based on operating conditions.

When a current measurement received from the high-side current sense block 530 indicates a current at or above the threshold reference current, the comparator 540 may notify the power supply controller 550 via a flag. The power supply controller 550 may record the over current event in log memory as diagnostics, and communicate this information (e.g., via telemetry system 28) near the surface, e.g., to provide a driller notice that a fault has occurred. However, as discussed in detail herein, downhole power generation may continue (e.g., at a reduced capacity) despite the fault condition such that a wellbore servicing operation (e.g., drilling) may optionally continue rather than discontinuing the service to retrieve the downhole components (e.g., tripping drill pipe out of and back into the wellbore).

During normal operation, the logic block 510 is configured to open or close the gate of the power FET 520 based on control signals received from the power supply controller 550, e.g., via a gate driver. For example, in an implementation based on the downhole electronic circuit 400, the power supply controller 550 may set the duty cycle for each FET such that when a given FET or pair of FETs is set to activate or turn on during normal operation, the controller may configure that FET or pair of FETs to remain active or on for a certain percentage (e.g., 30%, 40%, 50%, etc.) of the duty cycle.

In some cases, however, the logic block 510 may override control signals from the power supply controller 550 based on input received from the comparator 540. For example, the logic block 510 is configured to receive input from the comparator 540 indicative of current sensed by the high-side current sense block 530. When input from the comparator 540 indicates a current at or above the threshold reference current, the logic block 510 may be configured to prioritize the input from the comparator 540 over control signals from the power supply controller 550.

As previously discussed, current may rise at relatively high rates when a fault such as a short circuit occurs. Therefore, when input from the comparator 540 is indicative of a fault event, the logic block 510 may automatically prioritize the input from the comparator 540 over control signals from the power supply controller 550 so as to minimize response time (e.g., respond very quickly to an over current condition). For example, in the phase-to-phase short shown in FIG. 4C, assume the power FET 520 represents FET Q5 through which the shunt current flows (e.g., current from capacitor bank 450 and/or C1). If comparator 540 determines that the current sensed by the high-side current sense block 530 in this example has reached the maximum threshold, the logic block 510 may automatically overtake control of the gate of FET Q5 (and corresponding FET Q6 on the low-power side). For example, if the gate of FET Q5 was to turn on that instant, the logic block 510 may instantly open the gate of FET Q5 (and FET Q6), thereby dropping the incoming current flow to zero. Meanwhile, the remaining FETs Q1-Q4 may continue operating. For example, FETs corresponding to Bridge A (FETs Q1 and Q2) and Bridge B (FETs Q3 and Q4) may be sequentially switched on and off in round-robin fashion, e.g., according to duty cycle (i.e., the ratio of the on-time of an FET divided by the sum of the on-time and the off-time of the FET). In some embodiments, the power supply controller 550 may modify the duty cycle of one or more phases in the event of a fault. Alternatively, the duty cycle of one or more phases may be automatically modified in the event of a fault in which current flowing through a FET exceeds a pre-determined threshold. That is, the power supply controller 550 may configure the gate of such a FET (e.g., FET Q5 in the example above) to turn on according to the switching cycle, but the logic block 510 may immediately open the gate of that FET due to the high current detected that cycle. In such case, that FET may be on for such a brief duration that the duty cycle of the FET effectively becomes a substantially smaller percentage (e.g., 1% or 5%) than that configured by the power supply controller 550 (e.g., 30%, 40%, 50%, etc.).

In some scenarios involving a fault event, the power supply controller 550 may modify the duty cycles of the FETs Q1-Q6 in order to optimize the amount of power generated by an AC power source (e.g., source 310 or 410) or 3-phase generator. To this end, the power supply controller 550 may minimize or at least decrease the duty cycle for FETs corresponding to the faulty phase (i.e., Bridge C), and maximize or at least increase the duty cycle for FETs corresponding to the two healthy or non-faulty phases (i.e., Bridges A and B). In other words, the AC power source (e.g., source 310 or 410) or 3-phase generator may continue to operate when a fault occurs, but will generate less power because a phase corresponding to FETs Q5 and Q6 has shorted and stopped working. In such cases, the power supply controller 550 may alter the duty cycle of one or more downhole components (e.g., 3-phase generator) to try compensating for the faulty phase by maximizing usage of the operational phases.

In some scenarios, a fault detected by the high speed current sensing circuit 500 may comprise an intermittent short. In these scenarios, the power supply controller 550 may reconfigure the duty cycle of the AC power source (e.g., source 310 or 410) or 3-phase generator to operate as normal upon discontinuation of the fault condition. In other scenarios, a fault detected by the high sensing circuit 500 may comprise a permanent short, in which case the logic block 510 may instantly open the gates of the corresponding FETs (e.g., Q5 and Q6 in the example above) every cycle in which those FETs turn on. Thus, even in the case of a permanent fault, operation will continue such that the gates of a corresponding FET may turn on during a cycle in which other FETs turn off, but the logic block 510 may automatically open the gate of that FET due to the current sensed by the high-side current sense block 530 reaching or exceeding the maximum threshold during that cycle.

In scenarios involving a fault, the power supply controller 550 may selectively alter the duty cycle of the AC power source or 3-phase generator to optimize operation of any phase still generating power. This way, the AC power source or 3-phase generator continues to operate in the event of a fault, albeit in a "limp" or reduced power operating mode.

In other words, the AC-power source or 3-phase generator may still generate enough power to carry out one or more operations of the drilling system 80 as described with respect to FIG. 1 and/or one or more operations associated with removing a drill string 8 from a borehole 16 as described with respect to FIG. 2. Thus, operating in such a limp or reduced power mode preserves the ability of completing the wellbore service at hand (e.g., completion of a given drilling stage or depth). For example, while the generator 30 may generate reduced power in this mode, the generator 30 may still be able to provide the BHA 50 with sufficient power to continue drilling a well. By comparison, a wellbore service (e.g., drilling) may be disrupted with existing power regulation systems that reset and stop generating power in the event of a fault, resulting in costly downtime associated with tripping the BHA 50 to the surface 82 for repair and subsequently back downhole for resumed operations.

In some embodiments, a downhole electronic circuit may utilize the high current sensing circuit 500 to provide high-speed cycle-by-cycle control in combination with the blocking diode D8 to maximize protection of switching devices while providing continued operation at reduced power in the event of a fault. In implementations employing a multi-phase power source such as a 3-phase generator, the downhole electronic circuit may be configured to measure current at each phase of the 3-phase generator.

In some embodiments, a downhole electronic circuit may utilize the high current sensing circuit 500 in a pulse-skipping mode. For example, rather than regulating power on a cycle-by-cycle basis, the high current sensing circuit 500 may be configured to measure current or output current measurements every other cycle, or every fixed number of cycles. Further, a downhole electronic circuit as disclosed herein may be configured to dynamically switch between regulating power on a cycle-by-cycle basis and in a pulse-skipping mode, e.g., to optimize operation according to current operating conditions.

In implementations where the current sensing circuit 500 comprises a common circuit (e.g., such as shown in FIG. 4G) for all legs of a bridge, the power supply controller 550 driving the FETs Q1-Q6 may arbitrate as to which bridge (Bridge A, B, or C) results in "tripping" the circuit 500 based on current sensed by the high-side current sense block 530.

Modifications, additions, or omissions may be made to FIG. 5 without departing from the scope of the present disclosure. For example, one or more components associated with the high sensing circuit 500 may be implemented on a chip such as an integrated circuit, which may comprise various components such as, but not limited to, a microprocessor, microcontroller, memory configured to store instructions/code executable by the one or more components, input/output circuitry, etc. In some embodiments, the power supply controller 550 may be the same as the system controller 32 of FIG. 1.

As another example, one or more concepts described with respect to the current sensing circuit 500 may be similarly applicable to other scenarios. Fox example, a downhole electronic circuit according to embodiments of the disclosure may be detect a fault condition based on measuring parameters (e.g., voltage, temperature, motor speed, etc.) other than or in combination with measuring current. For instance, a fault condition may be detected by measuring temperature utilizing one or more sensors as described herein (e.g., downhole sensors). In accordance with one or more embodiments disclosed herein, a power source (e.g., power source 310, 410, or 3-phase alternator) may continue operating upon detection of the fault condition, but the power source may generate less energy than normal.

Figure 6:
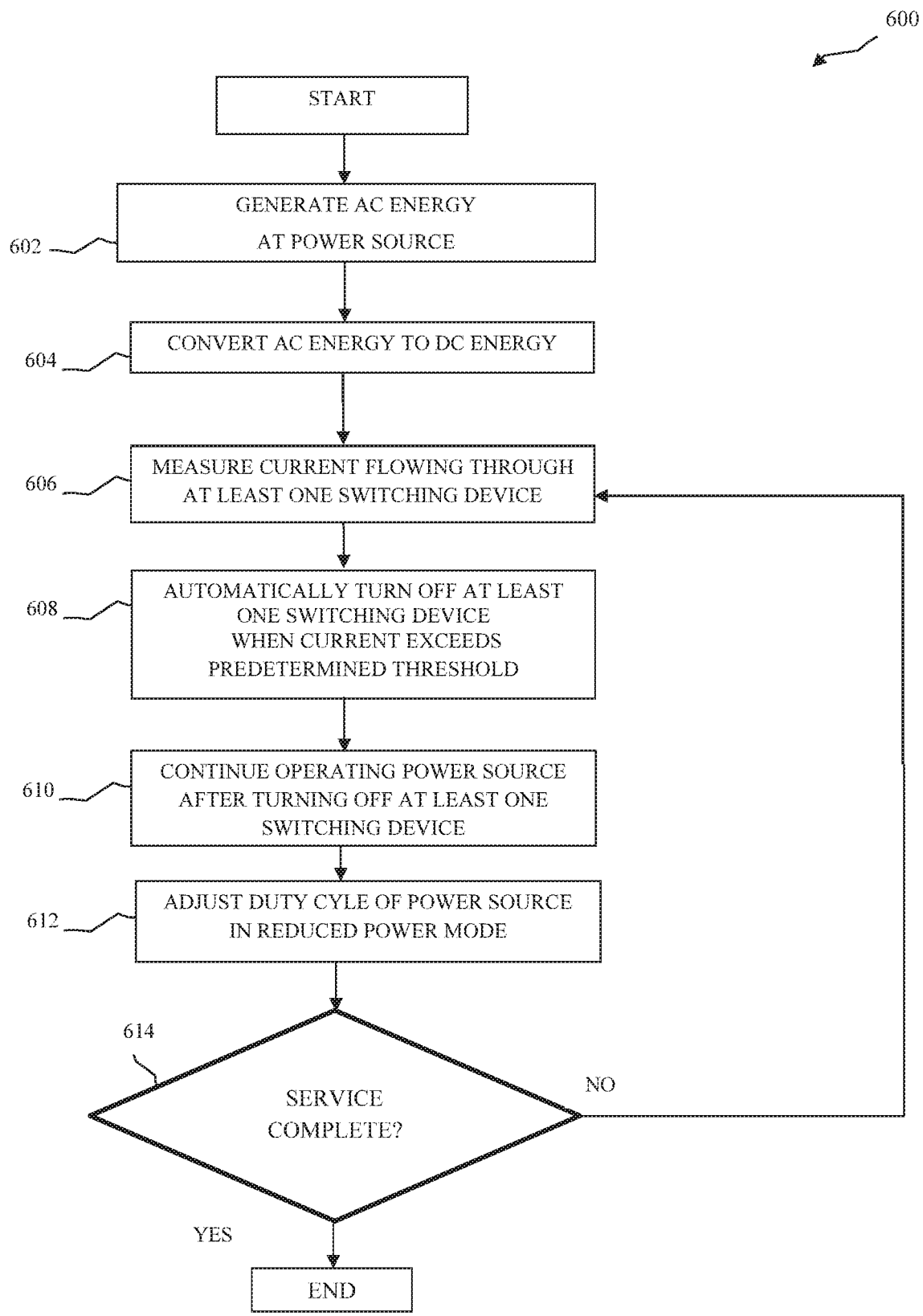
FIG. 6 illustrates a flowchart for regulating power in accordance with embodiments of the present disclosure.

FIG. 6 illustrates a method 600 of regulating power of downhole electronic components in accordance with embodiments of the present disclosure. The operations may be performed in the order shown, or in a different order. Further, two or more of the operations may be performed concurrently instead of sequentially. In some implementations, some of the operations of the method 600 can be implemented as instructions stored in a storage device and executed by a controller and/or processor.

At block 602, a power source generates AC energy, for example a power generator that has been placed downhole as part of a wellbore servicing operation such as downhole power generator 30 that is part of BHA 50 as shown in FIG. 1. Power may be generated downhole (e.g., AC energy that is convert to DC energy) concurrent with conducting a wellbore servicing operation such as logging and/or drilling, whereby the power generated downhole is used to power one or more downhole components (e.g., LWD/MWD elements 26 and/or telemetry element 28 of BHA 50) as described in more detail herein with reference to FIGS. 1 and 2. At block 604, AC energy generated at block 602 is converted into DC energy by a converter circuit coupled to the power source. At block 606, current flowing through one or more switching devices in the converter circuit is measured by a current sensing circuit coupled to the converter circuit. In some implementations, the converter circuit may comprise at least two sets of switching device that sequentially turn on and off each operating cycle of the power source. As such, the current sensing circuit may measure current flowing through one or more switching devices within the at least two sets on a cycle-by-cycle basis.

At block 608, the current sensing circuit determines whether the measured current exceeds a predetermined threshold and automatically turns off at least one switching device when the current measurement exceeds the predetermined threshold during a given operating cycle in which the at least one switching device turns on. For example, if the current measurement corresponds to current flowing through a switching device disposed in a high-power side of the converter circuit (e.g., FETs Q1, Q3, or Q5 in FIGS. 4A-4G), the current sensing circuit may automatically turn off that switching device and a corresponding switching device disposed in a low-power side of the converter circuit (e.g., FETs Q2, Q4, or Q6 in FIGS. 4A-4G). When the current sensing circuit determines that the measured current exceeds a predetermined threshold, a signal may be sent to the surface (e.g., to an controller and/or operator) indicating that a fault condition exists in the downhole power generator 30, but downhole power generation and the associated wellbore service (e.g., drilling) are not halted completely in response to the existence of the fault condition.

After turning off the at least one switching device at block 608, the method 600 proceeds to block 610, where the power source continues operating after automatically turning off the at least one switching device. For example, the power source may not be capable of generating as much energy due to the fault condition, but the power source may continue operating in a reduced power mode. In accordance with the disclosed embodiments, the power source (e.g., downhole power source 30) may continue generating energy while operating in the reduced power mode such that the associated wellbore servicing operation (e.g., drilling) may continue, albeit in a reduced power or "limp" mode, which may be preferable economically to the lost time and expense of halting the wellbore servicing and tripping the BHA 50 out of the wellbore to repair the fault condition and back into the wellbore to continue the wellbore servicing (e.g., drilling). At block 612, a duty cycle of the power source is adjusted to optimize operation of the power source in the reduced power mode. At block 614, method 600 may determine whether a service involving the power source is complete (e.g., whether drilling of a wellbore has reached a target depth or whether a drilling interval has been completed). If so, the method 600 ends (e.g., drilling is halted and the drilling string and BHA 50 are removed from the wellbore such that the fault condition can be repaired, if needed). If not, the method 600 may return to block 606 and continue operating the power source in the reduced power mode until a service is complete (e.g., drilling of a wellbore has reached a target depth or whether a drilling interval has been completed) or until a subsequent current measurement of the at least one switching device that was turned off at block 608 indicates a current below the predetermined threshold (or example, where the fault condition is intermittent or temporary, and normal power generation has resumed downhole). If the latter, the power source may return to normal operation and generate energy at full power, and the associated wellbore servicing operation (e.g., drilling) can continue at regular/normal operating conditions. The ability to continue the wellbore servicing operation (e.g., drilling), even in a reduced capacity (e.g., limp mode), can provide a significant economic advantage over previous efforts to address fault conditions in downhole power generators, which often result in the total loss of downhole power requiring termination of the wellbore servicing operation (e.g., drilling) and tripping the BHA 50 out of the wellbore for repair and back into the wellbore to resume operations.

Figure 7:
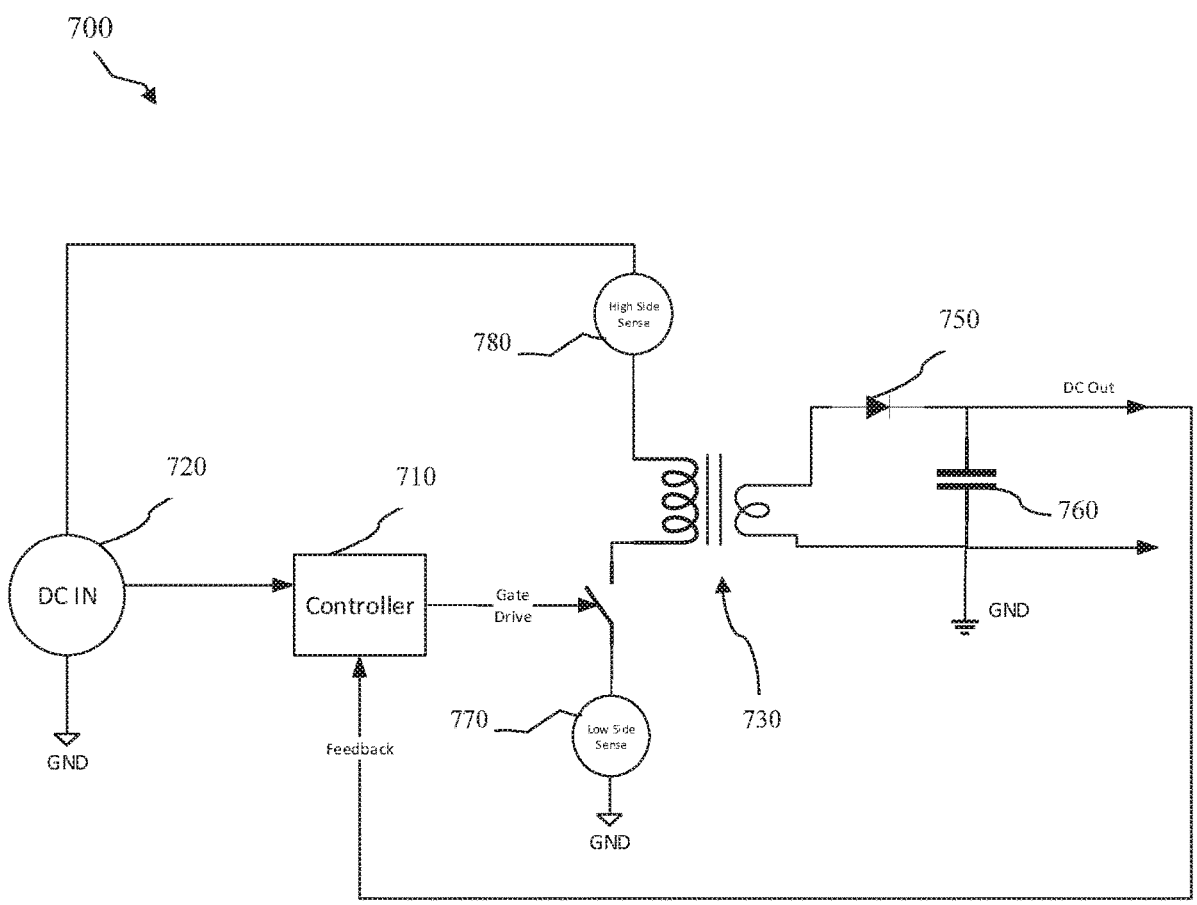
FIG. 7 illustrates another example downhole electronic circuit in accordance with embodiments of the present disclosure.

FIG. 7 illustrates an example of a downhole electronic circuit 700 according to embodiments of the disclosure. This example is based on a topology in which the downhole electronic circuit 700 comprises a flyback controller 710 coupled to a DC power source 720. However, the flyback controller 710 may be replaced with one or more other types of controllers in other examples. For instance, the flyback controller 710 may be replaced by a boost controller, in which case the downhole electronic circuit 700 may comprise an inductor and a diode connected to one end of the inductor. In some implementations, the flyback controller 710 may be similar to the system controller 32 of FIG. 1 or the power supply controller 550 of FIG. 5.

The downhole electronic circuit 700 further comprises a transformer 730 (e.g., a multi-phase transformer), a switching device 740, a rectifier or diode 750, a capacitor 760, at least one low-side current sensing component 770, and at least one high-side current sensing component 780. The low- and/or high-side current sensing components 770 and/or 780 may be substantially similar to those shown in FIGS. 4A-4G and FIG. 5. Further, although FIG. 7 depicts only one switching device 740, the downhole electronic may comprise or be coupled to multiple switching devices, e.g., switching devices 331 in FIG. 3 or FETS Q1, Q2, Q3, Q4, Q5, Q6 in FIGS. 4A-4G.

During operation, the controller 710 is configured to open or close the gate of the switching device 740 based on a duty cycle determined by the controller 710, e.g., depending on various operating parameters such as current measurements obtained from the low- and high-side current sensing components 770, 780. When the switching device 740 is closed, energy (e.g., current) in the transformer 730 may ramp up. When the switching device 740 is subsequently opened, the energy built up in the transformer 730 may be transferred (e.g., from its primary coil to its secondary coil) to the diode 750, which then charges the capacitor 760. In some implementations, when the low- or high-side current sensing component 770 or 780 detect a current value indicative of a fault (e.g., a current greater than or equal to a predetermined threshold), the controller 710 may output a signal to automatically open or close the gate of a switching device associated with the fault. Like the controller 550 in FIG. 5, the controller 710 may selectively alter the duty cycle of the power source 720 to optimize operation, e.g., such that the power source 720 continues to generate power while operating in a "limp" or reduced power mode.

ADDITIONAL DISCLOSURE

The following are non-limiting, specific embodiments in accordance with the present disclosure:

Embodiment A: A power regulating system, comprising a power source to generate energy, a converter circuit coupled to the power source, wherein the converter circuit comprises at least two sets of switching devices that sequentially turn on an off during operation of the power source, and a current sensing circuit coupled to the converter circuit, wherein the current sensing circuit measures current flowing through at least one switching device selected from the at least two sets of switching devices, and wherein the current sensing circuit automatically turns off the at least one switching device when a current measurement exceeds a predetermined threshold, wherein the power source continues generating energy after the at least one switching device is turned off.

Embodiment B: The power regulating system of Embodiment A, further comprising a system controller to adjust a duty cycle of the power source after the at least one switching device is turned off, wherein the power source continues generating energy while operating in a reduced power mode after the at least one switching device is turned off.

Embodiment C: The power regulating system of Embodiment B, wherein the current sensing circuit sends the system controller a flag after turning off the at least one switching device, the flag notifying the system controller that a fault has occurred and that the power source is operating in the reduced power mode.

Embodiment D: The power regulating system of any of Embodiments A to C, wherein the power source is a multi-phase alternating current (AC) power source, and wherein the current sensing circuit measures current at each phase of the multi-phase power source.

Embodiment E: The power regulating system of any of Embodiments A to D, wherein the power source is a three-phase alternator, and wherein the current sensing circuit is disposed in series to each winding of the three-phase alternator.

Embodiment F: The power regulating system of any of Embodiments A to D, wherein the current sensing circuit is disposed on a high-power side of the converter circuit and in series to a drain of each switching device in the high-power side.

Embodiment G: The power regulating system of any of Embodiments A to F, wherein the converter circuit includes a blocking diode to reduce inrush current flowing to the at least two sets of switching devices when the current measurement exceeds the predetermined threshold.

Embodiment H: A method, comprising generating alternating current (AC) energy at a power source, converting the AC energy to direct current (DC) energy at a converter circuit coupled to the power source, measuring current flowing through a switching device selected from at least two sets of switching devices in the converter circuit, automatically turning off the at least one switching device when a current measurement exceeds a predetermined threshold, and continuing, by the power source, to generate energy after the at least one switching device is turned off.

Embodiment I: The method of Embodiment H, further comprising adjusting a duty cycle of the power source after turning off the at least one switching device, wherein the power source continues generating energy while operating in a reduced power mode after turning off the at least one switching device.

Embodiment J: The method of Embodiment I, further comprising sending a flag to a system controller after turning off the at least one switching device, the flag notifying the system controller that a fault has occurred and that the power source is operating in the reduced power mode.

Embodiment K: The method of any of Embodiments H to J, wherein the power source is a multi-phase alternating current (AC) power source, and wherein measuring current comprises measuring current at each phase of the multi-phase power source.

Embodiment L: The method of Embodiments H to K, wherein the power source is a three-phase alternator, and wherein a current sensing circuit that measures current is disposed in series to each winding of the three-phase alternator.

Embodiment M: The method of any of Embodiments H to K, wherein a current sensing circuit measures current flowing through the switching device, wherein the current sensing circuit is disposed on a high-power side of the converter circuit and in series to a drain of each switching device in the high-power side.

Embodiment N: The method of any of Embodiments H to M, wherein the converter circuit includes a blocking diode to reduce inrush current flowing to the at least two sets of switching devices when the current measurement exceeds the predetermined threshold.

Embodiment O: A non-transitory storage medium comprising computer-readable instructions executable by a processor to implement a method for regulating power, the method comprising generating alternating current (AC) energy at a power source, converting the AC energy to direct current (DC) energy at a converter circuit coupled to the power source, measuring current flowing through a switching device selected from at least two sets of switching devices in the converter circuit, automatically turning off the at least one switching device when a current measurement exceeds a predetermined threshold, and continuing, by the power source, to generate energy after turning off the at least one switching device.

Embodiment P: The non-transitory storage medium of Embodiment O, the method further comprising adjusting a duty cycle of the power source after turning off the at least one switching device, wherein the power source continues generating energy while operating in a reduced power mode after turning off the at least one switching device.

Embodiment Q: The non-transitory storage medium of Embodiment O, the method further comprising sending a flag to a system controller after turning off the at least one switching device, the flag notifying the system controller that a fault has occurred and that the power source is operating in the reduced power mode.

Embodiment R: The non-transitory storage medium of any of Embodiments O to Q, wherein the power source is a multi-phase alternating current (AC) power source, and wherein measuring current comprises measuring current at each phase of the multi-phase power source.

Embodiment S: The non-transitory storage medium of any of Embodiments O to R, wherein a current sensing circuit measures current flowing through the switching device, wherein the current sensing circuit is disposed on a high-power side of the converter circuit and in series to a drain of each switching device in the high-power side.

Embodiment T: The non-transitory storage medium of any of Embodiments O to S, wherein the converter circuit includes a blocking diode to reduce inrush current flowing to the at least two sets of switching devices when the current measurement exceeds the predetermined threshold.

Embodiment U: A method of servicing a wellbore comprising placing the power regulating system of Embodiment A down a wellbore, operating the power regulating system in a normal mode to generate downhole power, and conducting a wellbore service utilizing the downhole power under normal operating conditions.

Embodiment V: The method of Embodiment U, wherein the wellbore service comprises drilling the wellbore and wherein the power regulating system is part of a bottom hole assembly of a drill string.

Embodiment W: The method of Embodiment U, wherein the wellbore service comprises drilling the wellbore; wherein the power regulating system is part of a bottom hole assembly of a drill string; and wherein responsive to a fault condition present in one or more components of the bottom hole assembly, the power regulating system continues generating energy while operating in a reduced power mode and the associated wellbore servicing operation continues during the existence of the fault condition.

Embodiment X: The method of Embodiment W, wherein the wellbore servicing operation continues in a reduced capacity compared to the normal operating conditions.

Embodiment Y: The method of Embodiment X, wherein the reduced capacity including drilling a drilling rate measured in feet per hour that is less than a desired drilling rate in feet per hour.

Embodiment Z: The method of Embodiment Y, wherein upon cessation of the fault condition, the power regulating system resumes generating energy in the normal mode.

Embodiment AA: The method of Embodiment Z, wherein the drilling resumes at the desired drilling rate in feet per hour.

Embodiment AB: The method of Embodiment Y, wherein upon completion of the drilling to a target depth, the drill string and bottom hole assembly comprising the power regulating system are removed from the wellbore.

Embodiment AC: The method of Embodiment AA, wherein upon completion of the drilling to a target depth, the drill string and bottom hole assembly comprising the power regulating system are removed from the wellbore.

Embodiment AD: The power regulating system of Embodiment B, wherein the system controller comprises a flyback controller.

Embodiment AE: The power regulating system of Embodiment B, wherein the system controller is configured to adjust or control a duty cycle of the at least one switching device on a cycle-by-cycle basis.

Embodiment AF: The power regulating system of Embodiment A, further comprising a system controller configured to adjust a duty cycle of the power source on a cycle-by-cycle basis.

Embodiment AG: The power regulating system of Embodiment AF, wherein the system controller is configured to dynamically switch from regulating power of the power source on the cycle-by-cycle basis to regulating power of the power source according to a pulse-skipping mode.

Embodiment AH: The power regulating system of Embodiment AG, wherein the system controller adjusts or monitors power of the power source after a fixed number of operating cycles when regulating power of the power source according to the pulse-skipping mode.

Embodiment AI: The power regulating system of Embodiment A, wherein the current sensing circuit measures current flowing through the at least one switching device selected from the at least two sets of switching devices on a cycle-by-cycle basis.

Embodiment AJ: The power regulating system of Embodiment AI, wherein the current sensing circuit automatically turns off the at least one switching device when the current measurement exceeds the predetermined threshold during any given cycle, thereby limiting duty cycle of the power source per cycle in which the current measurement exceeds the predetermined threshold.

Embodiment AK: A method, comprising generating alternating current (AC) energy at a power source; converting the AC energy to direct current (DC) energy at a converter circuit coupled to the power source; measuring, per operating cycle of the power source, current flowing through at least one switching device in the converter circuit; automatically turning off the at least one switching device when a current measurement exceeds a predetermined threshold during a first operating cycle of the power source; and continuing, by the power source, to generate energy during at least one of the first operating cycle or a second operating cycle immediately following the first operating cycle in which the at least one switching device is turned off.

Embodiment AL: The method of Embodiment AK, further comprising configuring a duty cycle of the at least one switching device on a cycle-by-cycle basis, wherein the power source continues generating energy while operating in a reduced power mode after turning off the at least one switching device.

Embodiment AM, the method of Embodiment AK and/or AL, wherein the converter circuit includes a blocking diode to reduce inrush current flowing to the at least one switching device when the current measurement exceeds the predetermined threshold.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

It is to be understood that any one or more of the embodiments disclosed herein may be implemented by a controller or control unit. For purposes of this disclosure, a controller or control unit may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a controller or control unit may be a personal computer, a network storage device, or any other suitable device and may vary in size, shape, performance, functionality, and price. The controller or control unit may include random access memory (RAM), one or more processing resources such as a central processing unit (CPU) or hardware or software control logic, ROM, and/or other types of nonvolatile memory. Additional components of the controller or control unit may include one or more disk drives, one or more network ports for communication with external devices as well as various input and output (I/O) devices, such as a keyboard, a mouse, and a video display. The controller or control unit may also include one or more buses operable to transmit communications between the various hardware components.

Further, the controller or control unit may comprise or be connected to computer-readable media. For purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The foregoing describes in detail a current sensing system, method, and apparatus in accordance with embodiments of the present disclosure. In this specification, examples are used to describe principles and implementations of the present disclosure, and the description of the embodiments is only intended to help understand such principles and implementations. In conclusion, the content of this specification shall not be construed as a limitation on the present disclosure.

What is claimed is:

1. A power regulating system, comprising:
a power source to generate energy for operating the power regulating system;
a converter circuit coupled to the power source, wherein the converter circuit comprises at least two sets of switching devices that sequentially turn on an off during each operating cycle of the power source; and
a current sensing circuit coupled to the converter circuit, wherein the current sensing circuit measures current flowing through at least one switching device selected from the at least two sets of switching devices each operating cycle of the power source, wherein the current sensing circuit automatically turns off the at least one switching device when a current measurement exceeds a predetermined threshold during any given operating cycle of the power source, and wherein the current sensing circuit automatically turns off the at least one switching device to limit a duty cycle of the at least one switching device per operating cycle in which the current measurement exceeds the predetermined threshold, wherein the power source continues generating energy to operate the power regulating system after the at least one switching device is turned off; and
a system controller to adjust a duty cycle of the power source after the at least one switching device is turned off, wherein the power source continues generating energy such that one or more electronic components in the power regulating system continue operating in a reduced power mode after the at least one switching device is turned off.

2. The power regulating system of claim 1, wherein the current sensing circuit sends the system controller a flag after turning off the at least one switching device, the flag notifying the system controller that a fault has occurred and that the one or more electronic components are operating in the reduced power mode.

3. The power regulating system of claim 1, wherein the power source is a multi-phase alternating current (AC) power source, and wherein the current sensing circuit measures current at each phase of the multi-phase power source.

4. The power regulating system of claim 1, wherein the power source is a three-phase alternator, and wherein the current sensing circuit is disposed in series to each winding of the three-phase alternator.

5. The power regulating system of claim 1, wherein the current sensing circuit is disposed on a high-power side of the converter circuit and in series to a drain of each switching device in the high-power side.

6. The power regulating system of claim 1, wherein the converter circuit includes a blocking diode to reduce inrush current flowing to the at least two sets of switching devices when the current measurement exceeds the predetermined threshold.

7. A method, comprising:
generating alternating current (AC) energy at a power source to operate a power regulating system;
converting the AC energy to direct current (DC) energy at a converter circuit coupled to the power source;
measuring, per operating cycle of the power source, current flowing through at least one switching device in the converter circuit;
limiting a duty cycle of the at least one switching device by automatically turning off the at least one switching device when a current measurement exceeds a predetermined threshold during a first operating cycle of the power source; and
continuing, by the power source, to generate energy during at least one of the first operating cycle or a second operating cycle immediately following the first operating cycle in which the at least one switching device is turned off, wherein the power source continues generating energy such that one or more electronic components in the power regulating system continue operating in a reduced power mode after turning off the at least one switching device.

8. The method of claim 7, further comprising configuring a duty cycle of the at least one switching device on a cycle-by-cycle basis.

9. The method of claim 8, further comprising sending a flag to a system controller after turning off the at least one switching device, the flag notifying the system controller that a fault has occurred and that the power source is operating in the reduced power mode.

10. The method of claim 7, wherein the power source is a multi-phase alternating current (AC) power source, and wherein measuring current comprises measuring current at each phase of the multi-phase power source.

11. The method of claim 7, wherein the power source is a three-phase alternator, and wherein a current sensing circuit that measures current is disposed in series to each winding of the three-phase alternator.

12. The method of claim 7, wherein a current sensing circuit measures current flowing through the switching device, wherein the current sensing circuit is disposed on a high-power side of the converter circuit and in series to a drain of each switching device in the high-power side.

13. The method of claim 7, wherein the converter circuit includes a blocking diode to reduce inrush current flowing to the at least one switching device when the current measurement exceeds the predetermined threshold.

14. A non-transitory storage medium comprising computer-readable instructions executable by a processor to implement a method for regulating power in a power regulation system, the method comprising:
generating, at a power source, alternating current (AC) energy, for operating the power regulating system;
converting the AC energy to direct current (DC) energy at a converter circuit coupled to the power source;
measuring current flowing through a switching device selected from at least two sets of switching devices in the converter circuit;
limiting a duty cycle of the at least one switching device by automatically turning off the at least one switching device when a current measurement exceeds a predetermined threshold;
continuing, by the power source, to generate energy after turning off the at least one switching device; and
operating, by one or more electronic components in the power regulating system, in a reduced power mode while the power source continues to generate energy after turning off the at least one switching device.

15. The non-transitory storage medium of claim 14, the method further comprising adjusting a duty cycle of the power source after turning off the at least one switching device.

16. The non-transitory storage medium of claim 14, the method further comprising sending a flag to a system controller after turning off the at least one switching device, the flag notifying the system controller that a fault has occurred and that the power source is operating in the reduced power mode.

17. The non-transitory storage medium of claim 14, wherein the power source is a multi-phase alternating current (AC) power source, and wherein measuring current comprises measuring current at each phase of the multi-phase power source.

18. The non-transitory storage medium of claim 14, wherein a current sensing circuit measures current flowing through the switching device, wherein the current sensing circuit is disposed on a high-power side of the converter circuit and in series to a drain of each switching device in the high-power side.

19. The non-transitory storage medium of claim 14, wherein the converter circuit includes a blocking diode to reduce inrush current flowing to the at least two sets of switching devices when the current measurement exceeds the predetermined threshold.

20. The power regulating system of claim 1, wherein the duty cycle is a ratio of an on-time of the at least one switching device divided by a sum of the on-time and an off-time of the at least one switching device.

* * * * *